(12) United States Patent  
Mcclure et al.

(10) Patent No.: US 11,703,013 B1  
(45) Date of Patent: Jul. 18, 2023

(54) ENGINE HEAD GASKET HAVING ANTI-PREIGNITION WRAP AND METHOD OF MAKING SAME

(71) Applicant: Caterpillar Inc., Peoria, IL (US)

(72) Inventors: Thomas Randall Mcclure, Washington, IL (US); Jonathan Richard Chittenden, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/685,711

(22) Filed: Mar. 3, 2022

(51) Int. Cl.
| | | |
|---|---|---|
| *F16J 15/00* | (2006.01) | |
| *F02F 11/00* | (2006.01) | |
| *B32B 3/04* | (2006.01) | |
| *B32B 3/26* | (2006.01) | |
| *B32B 3/08* | (2006.01) | |
| *F16J 15/08* | (2006.01) | |
| *B21D 53/84* | (2006.01) | |
| *B32B 15/01* | (2006.01) | |

(52) U.S. Cl.
CPC ............ *F02F 11/002* (2013.01); *B21D 53/84* (2013.01); *B32B 3/04* (2013.01); *B32B 3/08* (2013.01); *B32B 3/266* (2013.01); *B32B 15/015* (2013.01); *F16J 15/0818* (2013.01); *B32B 2581/00* (2013.01)

(58) Field of Classification Search
CPC .. F16J 15/0818; F16J 2015/0837; F16J 15/02; F16J 15/06; F16J 15/3276; F16J 15/3268; F16J 15/3272; F16J 3/043; F02F 11/002; F02F 11/00; B32B 2581/00; B32B 5/26; B32B 5/22; B32B 2250/03; B32B 2250/04; B32B 2250/05; B32B 2311/12; B32B 2311/30; B32B 3/02; B32B 3/04; B32B 3/06

See application file for complete search history.

(56) References Cited

U.S. PATENT DOCUMENTS

| | | | |
|---|---|---|---|
| 4,776,601 A | | 10/1988 | Yamada |
| 5,232,229 A | * | 8/1993 | Udagawa ............ F16J 15/0825 277/600 |

(Continued)

FOREIGN PATENT DOCUMENTS

| | | | |
|---|---|---|---|
| CN | 201535207 U | * | 7/2010 |
| DE | 2717663 A1 | | 10/1978 |

(Continued)

OTHER PUBLICATIONS

DE 29804534 U1 English translation (Year: 1998).*

*Primary Examiner* — George C Jin  
*Assistant Examiner* — Teuta B Holbrook  
(74) *Attorney, Agent, or Firm* — Brannon Sowers & Cracraft PC

(57) ABSTRACT

An engine head gasket includes a base layer, an upper layer, and a lower layer. The base layer includes a base layer inner edge. The engine head gasket further includes an anti-preignition wrap defining a cylinder opening and wrapped around the base layer inner edge. The engine head gasket is configured with a combustion seal and selective thicknesses to direct a combustion sealing load to a cylinder block. The anti-preignition wrap shields angular corners of the base layer inner edge from a cylinder to limit preignition.

18 Claims, 4 Drawing Sheets

(56) References Cited

U.S. PATENT DOCUMENTS

| | | | |
|---|---|---|---|
| 5,280,929 A * | 1/1994 | Miyaoh | F16J 15/0831 |
| | | | 277/599 |
| 5,395,127 A * | 3/1995 | Miyaoh | F16J 15/0825 |
| | | | 277/595 |
| 5,556,113 A | 9/1996 | Amorese et al. | |
| 6,139,024 A * | 10/2000 | Yakushiji | F16J 15/0825 |
| | | | 277/592 |
| 6,422,572 B1 * | 7/2002 | Ueda | F16J 15/0825 |
| | | | 277/593 |
| 6,565,099 B1 | 5/2003 | Ottinger et al. | |
| 6,962,349 B2 | 11/2005 | Notter et al. | |
| 9,482,179 B2 | 11/2016 | Nelson et al. | |
| 2002/0182414 A1 * | 12/2002 | Kincart | B32B 15/04 |
| | | | 427/404 |
| 2006/0131818 A1 * | 6/2006 | Diez | F16J 15/0825 |
| | | | 277/592 |
| 2010/0109256 A1 * | 5/2010 | Goettler | F16J 15/0818 |
| | | | 277/592 |

FOREIGN PATENT DOCUMENTS

| | | | | |
|---|---|---|---|---|
| DE | 3702452 | A1 | 8/1988 | |
| DE | 3820796 | C2 * | 10/1991 | |
| DE | 3229320 | C2 * | 6/1992 | |
| DE | 29804534 | U1 * | 5/1998 | F16J 15/0818 |
| EP | 1096181 | A2 * | 5/2001 | F16J 15/0825 |
| JP | H0942457 | A * | 3/1997 | |
| KR | 100223610 | B1 * | 10/1995 | |
| KR | 19990062845 | A * | 7/1996 | |
| KR | 100212893 | B1 * | 8/1999 | |

* cited by examiner

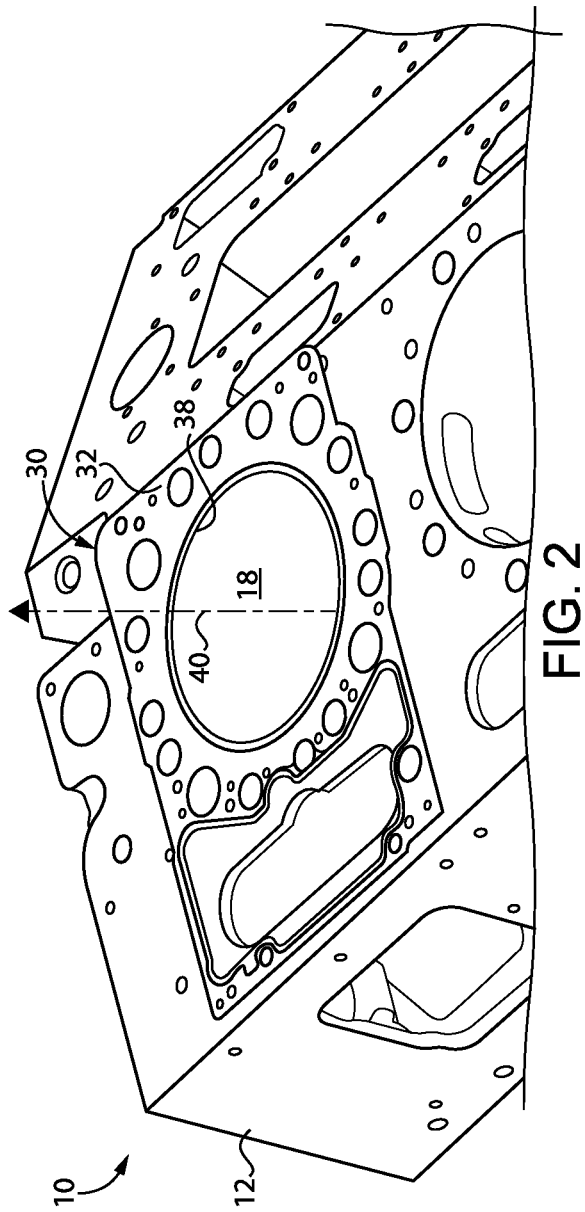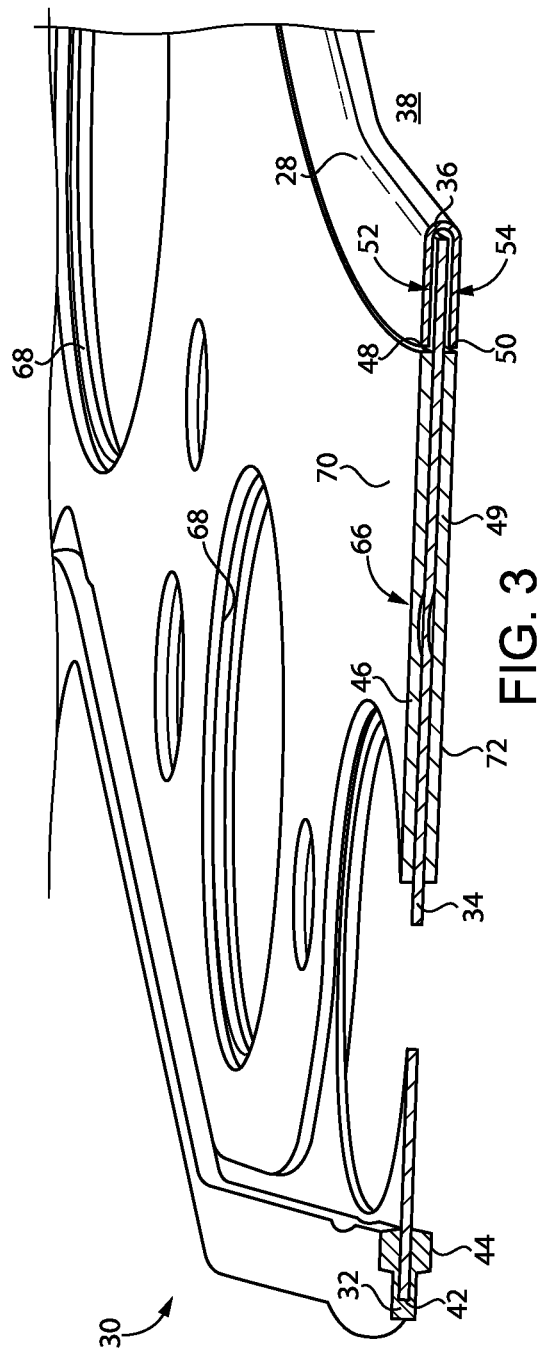

US 11,703,013 B1

ENGINE HEAD GASKET HAVING ANTI-PREIGNITION WRAP AND METHOD OF MAKING SAME

TECHNICAL FIELD

The present disclosure relates generally to a gasket, and more particularly to an engine head gasket having an anti-preignition wrap.

BACKGROUND

A great many different sealing strategies are used in connection with internal combustion engine cylinders. A head gasket having various fluid transfer openings for sealing fluid transfer passages between a cylinder block and an engine head is a well-known technology. Some head gasket configurations employ a separate combustion seal positioned between the engine head and cylinder block to contain combustion gases within a cylinder and surrounded by the head gasket. Other head gasket configurations incorporate the combustion seal into the gasket proper. A typical design includes several layered sheets of steel or another suitable metallic material with in-register holes in the sheets providing the fluid transfer openings for engine coolant or oil. "Beads" formed in one or more of the layered sheets provide for fluid seals once the head gasket is clamped in place.

The in-service environment of head gaskets tends to be quite harsh, with the head gasket materials experiencing relatively high temperatures, temperature cycling and, in a combustion seal region, high pressures. The clamping loads applied to a head gasket between an engine head and a cylinder block and/or intervening components also tend to be relatively large. Certain head gasket configurations have seen considerable commercial success over the years but are not without drawbacks with regard to in-service performance and manufacturability. One known engine head gasket design is set forth in United States Patent Application No. 2011/0139113A1 to Miller et al.

SUMMARY

In one aspect, an engine head gasket includes a base layer having a base layer inner edge extending circumferentially around a cylinder opening defining a center axis, and a base layer outer edge. The engine head gasket further includes an upper layer having an upper layer inner edge extending circumferentially around the cylinder opening and set back from the base layer inner edge, and a lower layer including a lower layer inner edge extending circumferentially around the cylinder opening and set back from the base layer inner edge. The engine head gasket further includes an anti-preignition wrap defining the cylinder opening and wrapped around the base layer inner edge so as to extend into an upper setback zone defined radially between the base layer inner edge and the upper layer inner edge and a lower setback zone defined radially between the base layer inner edge and the lower layer inner edge. A summed layer thickness through the base layer, the upper layer, and the lower layer, is greater than a summed layer thickness through the base layer and the anti-preignition wrap.

In another aspect, a gasket includes a multi-layered gasket body having an upper layer, a lower layer, and a base layer sandwiched between the upper layer and the lower layer. The base layer extends radially inward from each of the upper layer and the lower layer to a base layer inner edge having an angular corner and extending circumferentially around an opening defining a center axis. The gasket further includes an anti-preignition wrap wrapped around the base layer inner edge and including a curved bend section shielding the angular corner from the opening.

In still another aspect, a method of making a gasket includes positioning an anti-preignition wrap within an opening defining a center axis in a multi-layer gasket body including an upper layer, a lower layer, and a base layer sandwiched between the upper layer and the lower layer. The method further includes deforming the anti-preignition wrap around a base layer inner edge extending circumferentially around the opening, such that the anti-preignition wrap extends into an upper setback zone defined radially between the base layer inner edge and the upper layer and a lower setback zone defined radially between the base layer inner edge and the lower layer. The method further includes shielding angular corners of the base layer inner edge from the opening by way of the deforming the anti-preignition wrap.

BRIEF DESCRIPTION OF THE DRAWINGS

FIG. 2 is a diagrammatic view of portions of the engine as in FIG. 1;

FIG. 3 is a sectioned diagrammatic view of a gasket, according to one embodiment;

DETAILED DESCRIPTION

Figure 1:
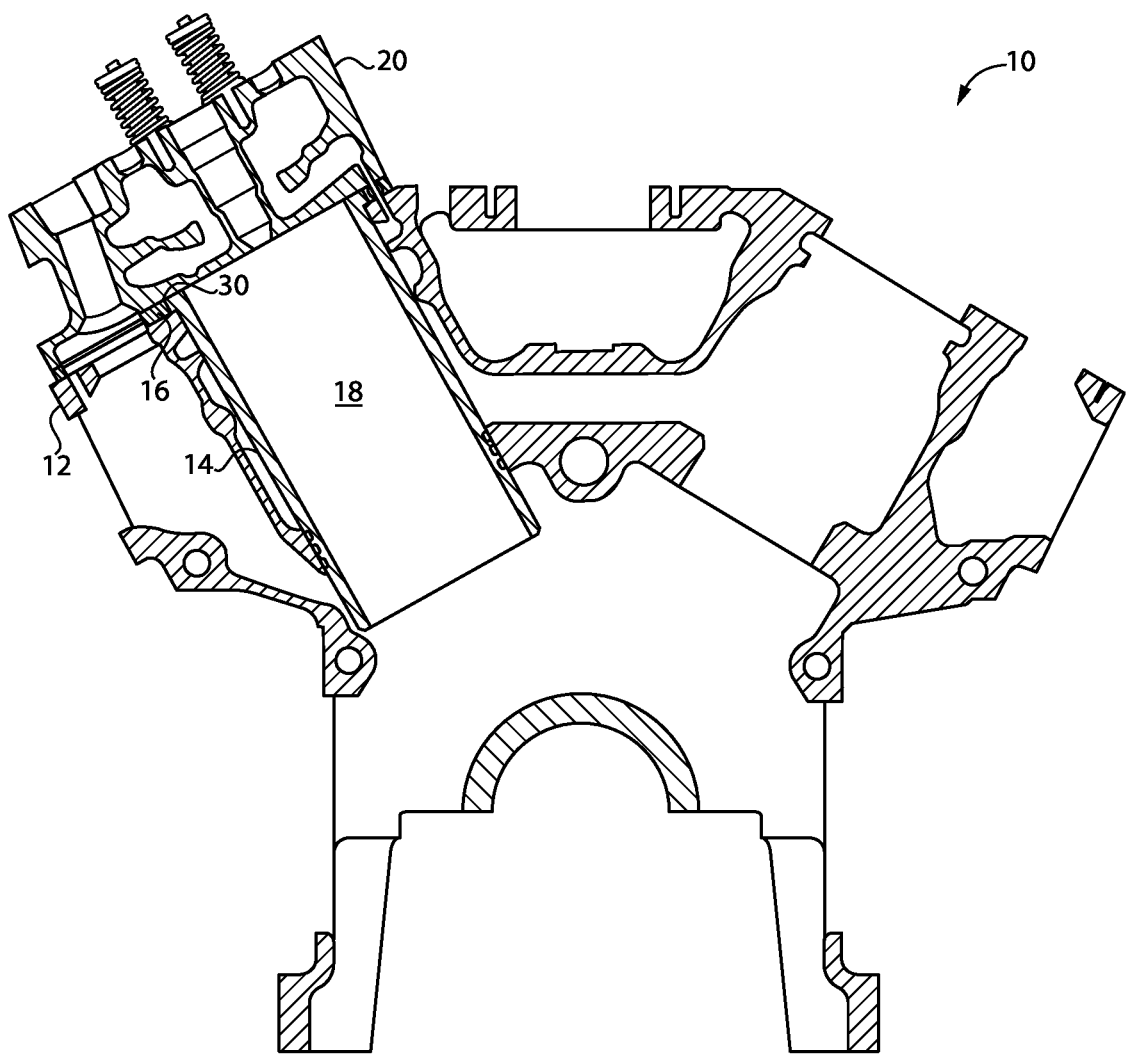
FIG. 1 is a sectioned diagrammatic view of an internal combustion engine, according to one embodiment.

Referring to FIG. 1, there is shown an internal combustion engine 10, according to one embodiment. Engine system 10 includes a cylinder block 12 and a cylinder liner 14 within cylinder block 12. Cylinder liner 14 is clamped, together with a spacer 16 and an engine head gasket 30, between an engine head 20 and cylinder block 12. Cylinder liner 14 defines a combustion cylinder 18. Engine head 20 may be configured to support engine valves and a fuel injector. Engine head 20 may be a unit head section associated with one cylinder, however, the present disclosure is not thereby limited. The engine valves can control fluid communication between cylinder 18 and intake and exhaust apparatus in a generally conventional manner. A fuel injector (not shown) may be supported in an injector bore in engine head 20 for direct injection of a fuel. A piston (not shown) will be positioned within cylinder 18 and movable between a top dead center position and a bottom dead center position, typically in a conventional four-cycle pattern, to rotate a crankshaft. Cylinder 18 may be one of a plurality of cylinders in engine 10 in any suitable arrangement such as a V-pattern, an in-line pattern, or still another.

In a practical implementation, engine 10 includes a compression-ignition diesel engine structured to operate on a liquid diesel distillate fuel, such that during a compression stroke gases in cylinder 18 may be compressed to an autoignition threshold for fuel and air therein. In other embodiments, engine 10 could be spark-ignited, configured as a dual liquid fuel and gaseous fuel engine, or could have a variety of other differences from that specifically illustrated. As will be further apparent from the following description, engine head gasket 30 may be adapted for limiting preignition and transferring clamping loads in an advantageous manner as compared to certain known designs.

Referring also now to the other Figures, engine head gasket 30 includes a multi-layer gasket body 32. Gasket body 32 includes a base layer 34 having a base layer inner edge 36 extending circumferentially around a cylinder opening 38 defining a center axis 40. Base layer 34 also includes a base layer outer edge 42. As can be seen from FIG. 3, a non-metallic oil seal may be molded over or otherwise attached to base layer outer edge 42. A plurality of fluid transfer openings 68 may extend through engine head gasket 30 at locations radially outward of cylinder opening 38. Gasket body 32 further includes an upper layer 46 including an upper layer inner edge 48 extending circumferentially around cylinder opening 38 and set back, in a radially outward direction, from base layer inner edge 36. Gasket body 32 also includes a lower layer 49 having a lower layer inner edge 50 extending circumferentially around cylinder opening 38 and set back, in a radially outward direction, from base layer inner edge 48.

Gasket body 32 may also include within base layer 34 a combustion seal bead 66 extending circumferentially around cylinder opening 38, and each of upper layer 46 and lower layer 49 extending radially inward from combustion seal bead 66 to the respective upper layer inner edge 48 and lower layer inner edge 50. Fluid transfer openings 68 can enable fluid transfer, including engine coolant and/or oil, between engine head 20 and cylinder block 12. Fluid transfer opening 68 may be positioned at locations radially between combustion seal bead 66 and base layer outer edge 42 to which oil seal or peripheral seal member 44 is attached.

Figure 5:
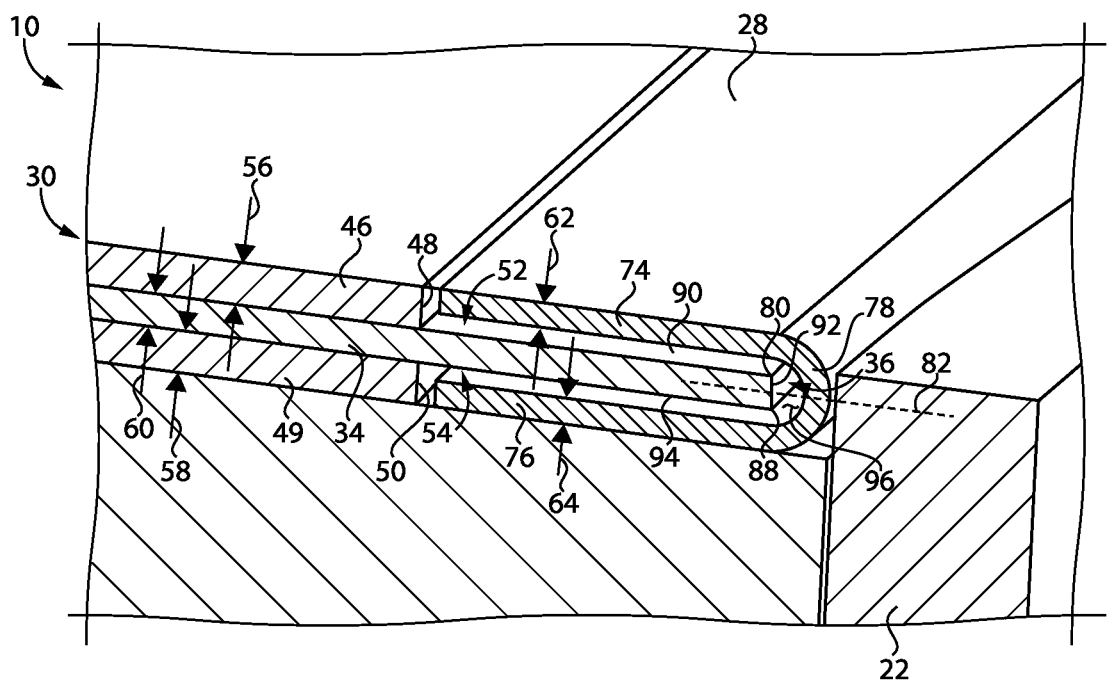
FIG. 5 is a sectioned diagrammatic view of portions of an internal combustion engine as in FIG. 1.

Base layer 34 is sandwiched between upper layer 46 and lower layer 49, and may be sandwiched directly between upper layer 46 and lower layer 49 such that engine head gasket 30 includes a total of three gasket layers. A head-side clamping surface 70 may be formed upon upper layer 46 to be clamped in contact with engine head 20, and a block-side clamping surface 72 formed upon lower layer 49 to be clamped in contact with spacer 16. Base layer 34 extends radially inward from each of upper layer 46 and lower layer 49 to base layer inner edge 36. As can be seen in FIG. 5, base layer inner edge 36 includes a first angular corner 80 and a second angular corner 88 each extending circumferentially around cylinder opening 38. It has been observed that certain sharp features, including features similar to angular corners 80 and 88, can serve as ignition or preignition triggering locations in an engine head gasket when exposed directly to combustion gases in a cylinder. As further discussed herein, engine head gasket 30 is uniquely configured to shield sharp features such as angular corners 80 and 88 from combustion gases to limit preignition phenomena.

To this end, engine head gasket 30 further includes an anti-preignition wrap 28 defining cylinder opening 38 and wrapped around base layer inner edge 36 so as to extend into an upper setback zone 52 defined radially between base layer inner edge 36 and upper layer inner edge 48, and into a lower setback zone 54 defined radially between base layer inner edge 36 and lower layer inner edge 50. Anti-preignition wrap 28 may include an upper leg 74 within upper setback zone 52, a lower leg 76 within lower setback zone 54, and a curved bend section 78 that defines cylinder opening 38 and connects between upper leg 74 and lower leg 76. Upper leg 74 extends between curved bend section 78 and upper layer 46, and lower leg 76 extends between curved bend section 78 and lower layer 49. Curved bend section 78 thus extends around base layer inner edge 36 and has a rounded profile. Providing a rounded profile as shown and described eliminates exposure of angular or otherwise sharp edges to combustion gases. In an implementation, anti-preignition wrap 28 forms a U-shape in cross-section. In some embodiments base layer 34, upper layer 46, lower layer 49, and anti-preignition wrap 28 could all be formed of the same material such as a suitable steel material. In other embodiments, differing materials can be used. For instance, base layer 34 may be formed of a steel material, and anti-preignition wrap 28 may be formed of a second material different from the steel material. The second material may be copper in some embodiments.

Figure 4:
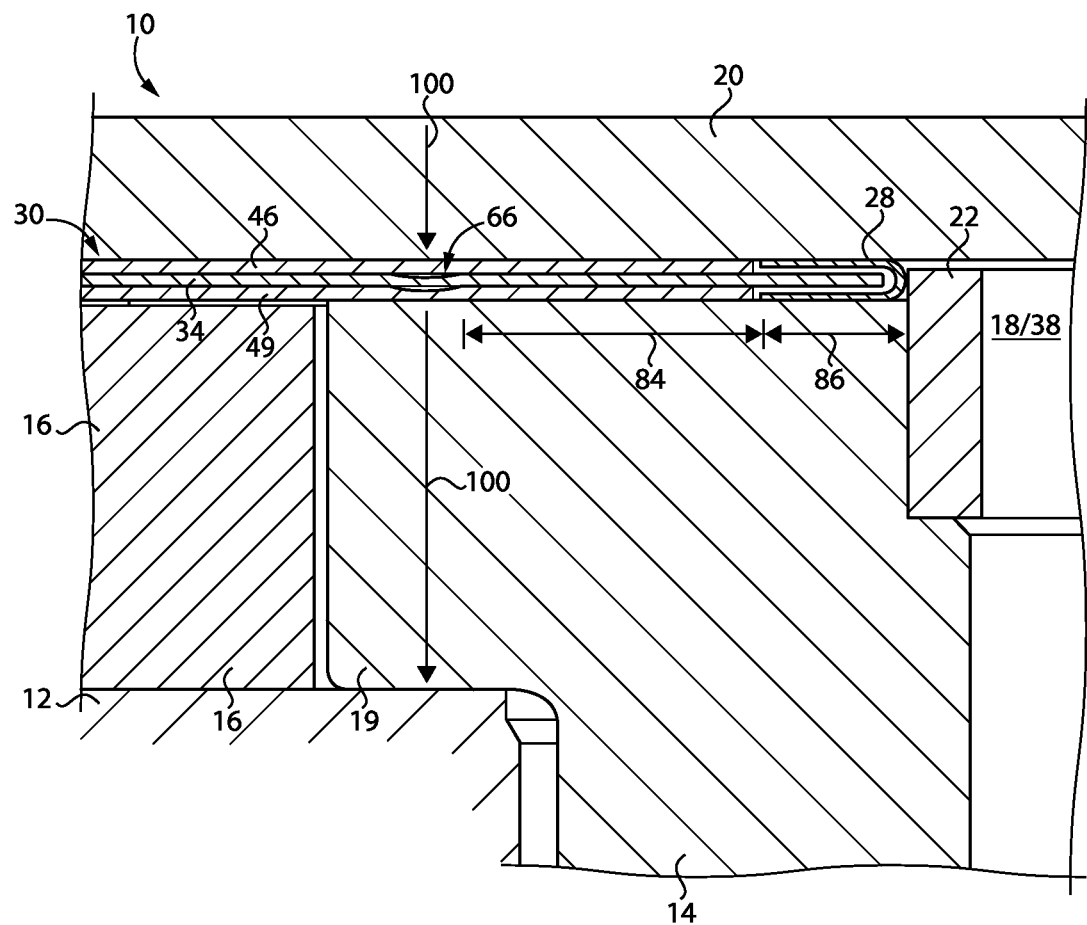
FIG. 4 is a sectioned diagrammatic view of portions of an internal combustion engine as in FIG. 1.

Focusing now on FIG. 4, engine head gasket 30 is shown as it might appear clamped between engine head 20 and cylinder block 12. As shown in FIG. 4, cylinder liner 14 may include a peripheral and circumferential shoulder 19 in contact with cylinder block 12. In the left side of FIG. 4 spacer 16 is shown clamped between engine head gasket 30 and cylinder block 12. In the right side of FIG. 4 a liner cuff 22 is shown supported on cylinder liner 14. Combustion seal bead 66 can be seen to be clamped between engine head 20 and cylinder block 12 such that a clamping load shown by way of arrows 100 is directed through combustion seal bead 66 directly to cylinder block 12. As also depicted in FIG. 4, it will be noted that a space between combustion seal bead 66 and cuff 22 is filled with the several layers of engine head gasket 30. In an embodiment, a running distance 84, understood to be on a radius of a circle defined by center axis 40, between combustion seal bead 66 and anti-preignition wrap 28, is greater than a width 86, on the radius of that circle, defined by anti-preignition wrap 28.

Focusing now on FIG. 5, there can be seen features of engine head gasket 30 in further detail. It can be noted from FIG. 5 that angular corner 80 includes a first square corner formed at a transition between an upper surface 90 of base layer 34 and a radially inward edge surface 92 of base layer 34. It can further be seen that angular corner 88 includes a second square corner formed at a transition between a lower surface 94 of base layer 34 and radially inward edge surface 92. Angular corners 80 and 88 can further be understood as outside of the multi-layered structured formed by base layer 34, upper layer 46, and lower layer 49. A clearance 96 extends radially between curved bend section 78 and radially inward edge surface 92 as illustrated. A radially inward terminal location, meaning the set of radially innermost points of bend section 78, defines a plane 82 oriented normal to center axis 40 and extending through base layer inner edge 36. In a practical implementation, base layer 34 itself may be approximately bisected axially by plane 82.

With continued focus on FIG. 5, a summed layer thickness through base layer 34, upper layer 46, and lower layer 49, may be greater than a summed layer thickness through base layer 34 and anti-preignition wrap 28. In particular, upper layer 46 includes an upper layer thickness 56, lower layer 49 includes a lower layer thickness 58, and base layer 34 includes a base layer thickness 60. Upper leg 74 includes an upper leg thickness 62, and lower leg 76 includes a lower leg thickness 64. A sum of upper layer thickness 56, lower layer thickness 58, and base layer thickness 60 may be greater than a sum of base layer thickness 60, upper leg thickness 62, and lower leg thickness 64. As a result, when engine head gasket 30 is clamped in place for service, potentially including some crushing down of anti-preignition wrap 28, load transfer of the clamping load to cylinder liner 14 where not supported by cylinder block 12 can be minimized. As will be readily understood from FIG. 4, clamping load 100 through combustion seal bead 66 passes directly into cylinder block 12 while a clamping load that would be seen by anti-preignition wrap 28 would transfer minimally into the otherwise unsupported and more radially inward parts of cylinder liner 14.

Industrial Applicability

Figure 6:
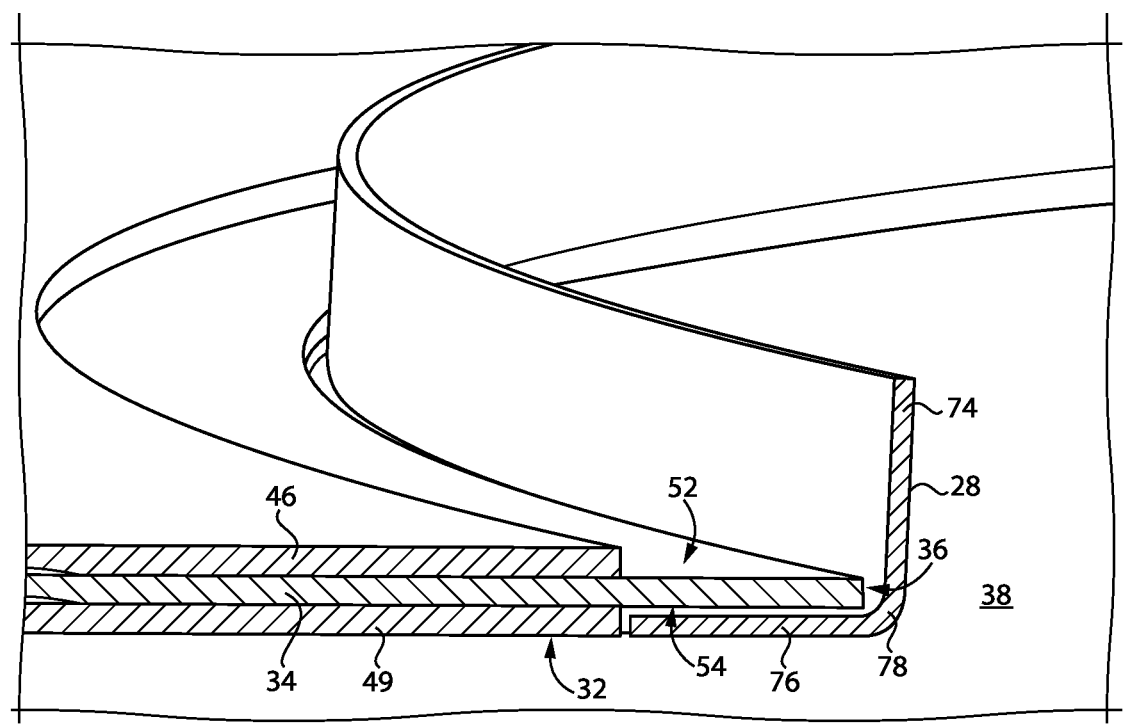
FIG. 6 is a sectioned diagrammatic view of a gasket at an assembly stage, according to one embodiment.

Referring to the drawings generally, but focusing now on FIG. 6, making engine head gasket 30 can include positioning anti-preignition wrap 28 within opening 28 defining center axis 40 in multi-layered gasket body 32. In the illustrated embodiment, anti-preignition wrap 28 may be formed approximately into an L-shaped cross-section, and inserted into opening 38 such that leg 76 is within setback zone 54. With anti-preignition wrap 28 in this general configuration, anti-preignition wrap 28 can be deformed around base layer inner edge 36 such that leg 74 extends into upper setback zone 52. This methodology can render an apparatus approximately as depicted in the other drawings, including in FIG. 5 where angular corners 80 and 88 are shielded from opening 38 by way of the deforming of anti-preignition wrap 28. Curved bend section 78 is formed at a location radially inward of angular corners 80 and 88 such that a rounded surface of anti-preignition wrap 28 upon curved bend section 78 will now be exposed to opening 38 and to combustion gases in cylinder 18. When installed in engine system 10 the reduced summed thickness of the layers of gasket body 32 formed by base layer 34 and anti-preignition wrap 28 will be less than the summed thickness through base layer 34, upper layer 46, and lower layer 49, imparting the load transfer characteristics described herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine head gasket comprising:
a base layer having a base layer inner edge extending circumferentially around a cylinder opening defining a center axis, and a base layer outer edge;
an upper layer including an upper layer inner edge extending circumferentially around the cylinder opening and set back from the base layer inner edge;
a lower layer including a lower layer inner edge extending circumferentially around the cylinder opening and set back from the base layer inner edge;
an anti-preignition wrap defining the cylinder opening and wrapped around the base layer inner edge so as to extend into an upper setback zone defined radially between the base layer inner edge and the upper layer inner edge and a lower setback zone defined radially between the base layer inner edge and the lower layer inner edge;
a fluid transfer opening extending through the engine head gasket at a location radially outward of the cylinder opening;
a diameter of the cylinder opening is greater than a diameter of the fluid transfer opening; and
a summed layer thickness through the base layer, the upper layer, and the lower layer, is greater than a summed layer thickness through the base layer and the anti-preignition wrap.

2. The engine head gasket of claim 1 wherein the base layer further includes a combustion seal bead extending circumferentially around the cylinder opening, and each of the upper layer and the lower layer extends radially inward from the combustion seal bead to the respective upper layer inner edge and lower layer inner edge.

3. The engine head gasket of claim 2 wherein a plurality of fluid transfer openings extend through the engine head gasket at locations radially between the combustion seal bead and the base layer outer edge, and further comprising a peripheral seal member attached to the base layer outer edge.

4. The engine head gasket of claim 1 further comprising a head-side clamping surface formed upon the upper layer, and a block-side clamping surface formed upon the lower layer, and the base layer is sandwiched directly between the upper layer and the lower layer.

5. The engine head gasket of claim 1 wherein the anti-preignition wrap includes an upper leg within the upper setback zone, a lower leg within the lower setback zone, and a curved bend section defining the cylinder opening connecting between the upper leg and the lower leg and having a rounded profile.

6. The engine head gasket of claim 5 wherein the anti-preignition wrap forms a U-shape in cross-section.

7. The engine head gasket of claim 1 wherein the base layer is formed of a steel material, and the anti-preignition wrap is formed of a second material different from the steel material.

8. The engine head gasket of claim 7 wherein the second material is copper.

9. A gasket comprising: a multi-layered gasket body including an upper layer, a lower layer, and a base layer sandwiched between the upper layer and the lower layer;
the base layer extending radially inward from each of the upper layer and the lower layer to a base layer inner edge having an angular corner formed at a transition between a radially innermost edge surface of the base layer and one of an upper surface or a lower surface of the base layer and extending circumferentially around an opening defining a center axis;
an anti-preignition wrap wrapped around the base layer inner edge and including a curved bend section shielding the angular corner from the opening;
the anti-preignition wrap defining a cylinder opening and wrapped around the base layer inner edge so as to extend into an upper setback zone defined radially between the base layer inner edge and the upper layer inner edge and a lower setback zone defined radially between the base layer inner edge and the lower layer inner edge; and,
wherein a summed layer thickness through the base layer, the upper layer, and the lower layer, is greater than a summed layer thickness through the base layer and the anti-preignition wrap.

10. The gasket of claim 9 wherein a radially inward terminal location of the bend section defines a plane oriented normal to the center axis and extending through the base layer inner edge.

11. The gasket of claim 10 wherein:
the anti-preignition wrap includes an upper leg extending between the curved bend section and the upper layer, and a lower leg extending between the curved bend section and the lower layer; and
the anti-preignition wrap forms a U-shape in cross section.

12. The gasket of claim 9 wherein the multi-layer gasket body further includes a combustion seal bead formed radially outward of the anti-preignition wrap, and each of the base layer, the upper layer, and the lower layer extends radially inward from the combustion seal bead.

13. The gasket of claim 12 wherein a running distance, on a radius of a circle defined by the center axis, between the combustion seal bead and the anti-preignition wrap, is greater than a width, on the radius of the circle, defined by the anti-preignition wrap.

14. The gasket of claim 9 wherein the angular corner includes a first square corner formed at a transition between an upper surface of the base layer and a radially inward edge surface of the base layer, and the base layer further includes a second square corner formed at a transition between a lower surface of the base layer and the radially inward edge surface.

15. The gasket of claim 14 wherein a clearance extends between the curved bend section and the radially inward edge surface.

16. A method of making a gasket comprising: positioning an anti-preignition wrap within an opening defining a center axis in a multi-layered gasket body including an upper layer, a lower layer, and a base layer sandwiched between the upper layer and the lower layer;
deforming the anti-preignition wrap around a base layer inner edge extending circumferentially around the opening, such that the anti-preignition wrap extends into an upper setback zone defined radially between the base layer inner edge and the upper layer and a lower setback zone defined radially between the base layer inner edge and the lower layer; shielding angular corners of the base layer inner edge from the opening by way of the deforming the anti-preignition wrap, the angular corners being formed, respectively, at transitions between a radially innermost edge surface of the base layer and an upper surface and a lower surface of the base layer; and,
wherein a summed layer thickness through the base layer, the upper layer, and the lower layer, is greater than a summed layer thickness through the base layer and the anti-preignition wrap.

17. The method of claim 16 wherein the deforming the anti-preignition wrap further includes forming a curved bend section at a location radially inward of the angular corners and having a rounded surface exposed to the opening.

18. The method of claim 17 further comprising forming a clearance between the curved bend section and the base layer inner edge.

* * * * *